Ｕnited States Patent [19]

Sasano et al.

[11] 3,957,609
[45] May 18, 1976

[54] METHOD OF FORMING FINE PATTERN OF THIN, TRANSPARENT, CONDUCTIVE FILM

[75] Inventors: Akira Sasano, Kodaira; Kikuo Douta, Hachioji; Mikio Ashikawa, Koganei, all of Japan

[73] Assignee: Hitachi, Ltd., Japan

[22] Filed: Sept. 12, 1974

[21] Appl. No.: 505,598

[30] Foreign Application Priority Data

Sept. 28, 1973 Japan.............................. 48-108374

[52] U.S. Cl. ................................. 204/192; 313/370
[51] Int. Cl.² .............................................. C23C 15/00
[58] Field of Search ............................ 204/192, 298

[56] References Cited
UNITED STATES PATENTS

| 3,436,327 | 4/1969 | Shockley | 204/192 |
|---|---|---|---|
| 3,642,548 | 2/1972 | Eger | 204/192 X |
| 3,649,503 | 3/1972 | Terry | 204/192 |
| 3,748,246 | 7/1973 | Goell | 204/192 |
| 3,791,952 | 2/1974 | Labuda et al. | 204/192 |
| 3,836,446 | 9/1974 | Tiefert | 204/192 |
| 3,847,776 | 11/1974 | Bourdon et al. | 204/192 |
| 3,873,361 | 3/1975 | Franco et al. | 204/192 X |

*Primary Examiner*—John H. Mack
*Assistant Examiner*—Aaron Weisstuch
*Attorney, Agent, or Firm*—Craig & Antonelli

[57] ABSTRACT

A thin film mask having a predetermined pattern is formed directly on a thin, transparent, conductive $SnO_2$ film formed on a dielectric substrate in order to form a fine pattern of the transparent, conductive film and that part of the transparent conductive film which is not covered by the mask is etched away through the bombardment with ions of gas accelerated under the influence of an RF electric field. Suitable masks include photoresists, aluminum, chromium, and manganese.

10 Claims, 10 Drawing Figures

METHOD OF FORMING FINE PATTERN OF THIN, TRANSPARENT, CONDUCTIVE FILM

This invention relates to a method of forming a fine pattern on the transport electrode in an image pickup tube, especially in a color image pickup tube having color filters therein.

Recently, a color camera using two pickup tubes or a single one has been developed to replace a conventional color camera using 3 to 4 pickup tubes and in order to obtain the chrominance signals of the respective primary colors with the image pickup tubes of such a color camera, the transparent electrodes of the pickup tubes must be so formed as to consist of a plurality of fine stripes. As this transparent electrode is used a thin film, mainly of tin dioxide, $SnO_2$, formed by spraying a solution including a major part of tin chloride $SnCl_4$ onto a glass substrate heated up to about 500°C.

According to a conventional method of forming a transparent electrode having $SnO_2$ as its main constituent into a structure of stripes, when a solution including $SnCl_4$ is sprayed onto a glass substrate, a mask of metal having openings in the form of stripes is placed on the glass substrate. In this method, however, it is very difficult to put the metal mask and the glass substrate in close contact with each other so that the lower limit of the width of each strip is about 0.1 mm, that is, a stripe having a width less than 0.1 mm cannot be shaped accurately.

Another conventional method is one using photolithography. According to this method, a photoresist film is first formed by an ordinary process on a thin film serving as a transparent electrode sprayed on a glass substrate and then subjected to exposure and development to remove that portion of the photoresist film which does not form stripes. The stripes of $SnO_2$ are formed by dissolving the bare portion of the $SnO_2$ film in a solution having hydrochloric acid and zinc powder mixed together. According to this method, as fine a stripe as can be formed through an ordinary photolithography can be obtained. However, since the mixed solution of hydrochloric acid and zinc powder, used to dissolve $SnO_2$, generates hydrogen gas, a great number of bubbles are produced in the solution. As a result, microscopic defects or flaws are caused in the finished stripes, or some of the stripes are bridged on a microscopic scale.

Further, the lift off method is known as another example. Aluminum (Al) is first vapor-deposited on a glass substrate and the aluminum film is then so etched as to leave stripes of Al on the substrate. Tin dioxide ($SnO_2$) is sprayed on the surface of the substrate having the stripes thereon. The substrate is immersed in an etching solution for aluminum (Al) to remove the aluminum film and the $SnO_2$ film on the Al film. This method, however, has the drawback that the etching of stripes is rough and the dimensional precision is poorer.

According to one feature of this invention which has been made to eliminate the above mentioned drawback, there is provided a method of forming a fine pattern of a thin, transparent, conductive film, comprising the steps of forming a thin, transparent, conductive film on a dielectric substrate; forming a thin film mask having a predetermined pattern on the thin, transparent, conductive film; and etching the thin, transparent, conductive film by the bombardment through the mask with ions of gas accelerated under the influence of an RF electric field.

According to another feature of this invention there is provided a method of forming a fine pattern of a thin, transparent conductive film comprising the steps of forming a thin, transparent, conductive film on a dielectric substrate; vapor-depositing a thin film of a metal selected from the group consisting of aluminum, chromium and manganese directly on the thin, transparent, conductive film; etching the thin metal film into a mask pattern; and etching the thin, transparent, conductive film by the bombardment through the mask pattern with ions of gas accelerated under the influence of an RF electric field.

The present invention will be described in detail with reference to the accompanying drawings, illustrating some preferred embodiments by way of example, in which:

FIGS. 1A, 1B and 1C, respectively, show in longitudinal cross section the steps of process for fabricating a transparent electrode as one embodiment of the invention;

FIG. 2 shows in cross section an etching apparatus used in this invention;

FIGS. 3A, 3B and 3C respectively show in longitudinal cross section the steps of process for fabricating a transparent electrode as another embodiment of the invention;

This invention will be described below by way of embodiment.

EMBODIMENT 1

Figure 1A:
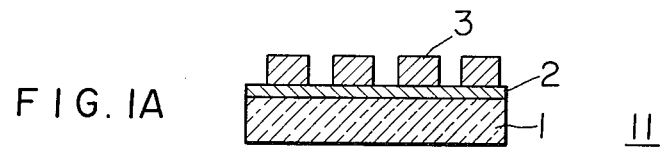
Figure 2:
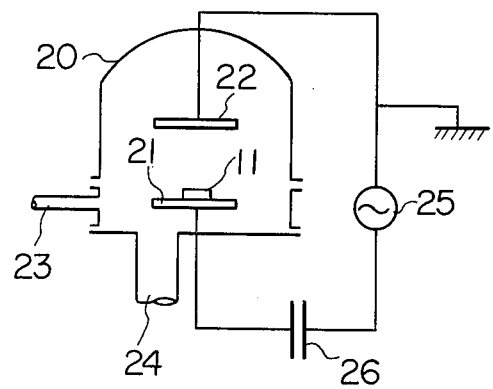

As shown in FIG. 1A, a film 2 of $SnO_2$ is formed on a glass substrate 1 and a photoresist film is in turn formed on the $SnO_2$ film 2. The portions of the photoresist film corresponding to a predetermined pattern are exposed and developed in an ordinary manner and the non-exposed portion of the photoresist film is removed to form a mask 3. Thereafter, a sample 11 as shown in FIG. 1A is placed on the target electrode 21 of the RF sputtering apparatus 20 shown in FIG. 2. The internal air is evacuated through the evacuating port 24 so that the pressure inside the apparatus may be below $5 \times 10^{-6}$ Torr. Argon gas at a pressure of about $5 \times 10^{-3}$ Torr is led into the apparatus through the gas inlet port 23. An RF field is established between the target electrode 21 and the grounded electrode 22 by an RF power source 25 connected through a capacitor 26 between the electrodes 21 and 22. As a result, the argon gas is ionized to bombard the sample 11 so that the $SnO_2$ film 2 is etched through the mask 3 of the photoresist film due to sputtering phenomenon. The mask 3 is removed, after completion of etching, by rubbing it with a cotton swab in an ordinary photoresist stripper (e.g. J-100 by Kodak Co.).

Figure 1B:
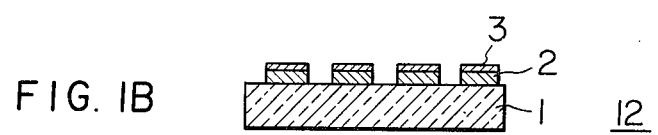

According to the method described above, as seen in the sample 12 shown in FIG. 1B, both the SnO₂ film 2 and the photoresist film 3 are etched due to the ion bombardment. The etching speed of the SnO₂ film is about 150 A/min. for an RF input of 100 W and that of the photoresist film (produced by Kodak Co. under trade mark KTFR) is almost the same. For an RF input of 200 W, the etching speeds of both the SnO₂ film and the photoresist film are about 300 A/min. The application of a higher power, however, causes heat in the sample and the photoresist film is melted. Therefore, a power higher than 200 W cannot be used. Accordingly, the photoresist film 3 must be made thicker than the SnO₂ film 2 and the SnO₂ film 2 usably has a thickness of about 1000 A and at most about 0.5 $\mu$m so that the photoresist film 3 has only to be about 1 $\mu$m thick.

Figure 1C:
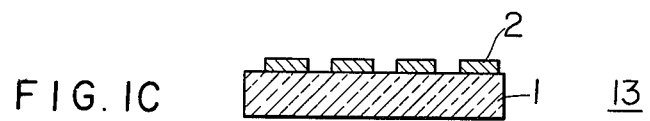

The SnO₂ film stripes of the sample 13 in FIG. 1C, obtained as above, were uniform over the entire surface of the sample and could be made fine to the utmost limit that photolithography can attain.

EMBODIMENT 2

In the case of the SnO₂ film 2 being rather thick, the time for etching must be longer and since the photoresist film is not so resistive to sputtering and heat, a higher input cannot be used. Moreover, since the photoresist film is an organic substance, it tends to soften and therefore to gather dust, which is very difficult to clean. Further, since the photoresist film is hardened due to the ion bombardment, it cannot be removed from the substrate unless it is rubbed by a cottom swab. These drawbacks, therefore, necessarily set a limit to the case where the stripes are formed through etching by the use of a photoresist film as a mask.

If a metal film more resistive to heat than the photoresist film is used as a mask for sputter etching in case of a thicker film of SnO₂, a higher power input can be used so that the time for etching can be shortened. Moreover, in this case, the deposited dust can be easily cleaned.

Figure 3A:
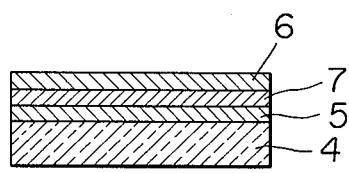
Figure 3B:
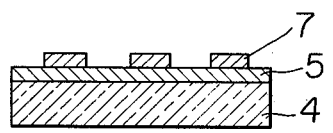
Figure 3C:
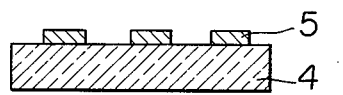

Namely, a SnO₂ film 5 having a thickness of about 3000 A is formed on a glass substrate 4 shown in FIG. 3A, an Al film 7 having a thickness of about 5000 A is formed on the SnO₂ film 5, and a photoresist film 6 is formed on the alminum film 7. Then, as shown in FIG. 3B, the Al film 7 is etched through an ordinary photolithographic process. The SnO₂ film 5 is in turn etched through the Al film 7 used as a mask in such a manner as described in EMBODIMENT 1 by the RF sputtering apparatus 20 shown in FIG. 2, having an RF input of 400 W. The unmasked SnO₂ film is completely etched off in about ten minutes. After the completion of the etching, the Al film 7 is immersed in an etching solution and removed as seen in FIG. 3C.

If about 10% of oxygen gas (O₂) is mixed in the argon gas, the resistivity of Al increases so that even an Al film having a thickness of about 3000 A can be sufficiently etched.

EMBODIMENT 3

There is a problem that since the Al film used as a metal mask in EMBODIMENT 2 is not sufficiently resistive to ion bombardment so that the top and side surfaces of the Al film gradually become rough during etching due to sputtering, then the finished stripes of transparent conductive film have roughened side surfaces.

Figure 4A:
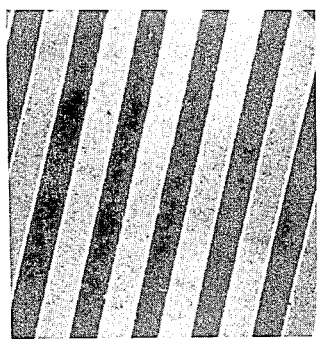
FIG. 4A is a photograph of a transparent electrode taken through a scanning type electron microscope set to a magnifying power of ×600, in which the stripes of the transparent electrode being formed by the use of a mask of Cr film according to the invention.

Therefore, the inventors used a Cr film as a mask, instead of an Al film. Namely, a SnO₂ film 5 having a thickness of about 5000 A is formed on a glass substrate 4, a Cr film 7 having a thickness of about 2000 A is formed on the SnO₂ film 5, and a photoresist film 6 is formed on the Cr film. Then, the Cr film 7 is subjected to etching through an ordinary photolithographic process. The SnO₂ film 5 is etched through the Cr film 4 used as a mask in such a manner as described in EMBODIMENT 1 by the RF sputtering apparatus 20 shown in FIG. 2, having an RF input of 200 W. The SnO₂ film 5 is completely removed in about 30 minutes. After the completion of the etching, the Cr film 7 is immersed in an etching solution and etched off to form stripes serving as transparent electrodes as shown in FIG. 4A. The preferable thickness of the Cr film is 1000 – 4000 A. This is because pin holes are formed in a Cr film having a thickness less than 1000 A and because a Cr film having a thickness more than 4000 A generates a contraction stress to cause the SnO₂ film to peel off.

FIG. 4a is a photograph of stripes, magnified by ×600, each having a width of 12 $\mu$m with gap 8 $\mu$m wide between stripes, in which the parts looking white are SnO₂ films while the black background is the surface of the glass substrate.

Figure 4B:
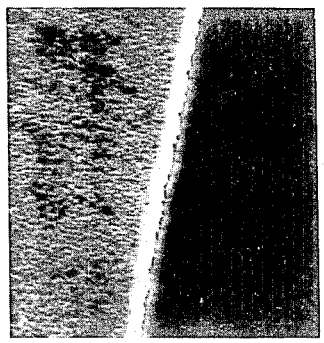
FIG. 4B is a photograph of the stripes taken through a scanning type electron microscope set to a magnifying power of ×4000.

FIG. 4B shows the side surfaces of stripes, magnified by ×4000, in which it is seen that the etching is smooth and uniform.

Figure 4C:
FIG. 4C is a photograph of the stripes of a transparent electrode fabricated according to the conventional method, taken through a scanning type electron microscope set to a magnifying power of ×4000.

FIG. 4C shows at a magnifying power of ×4000 the SnO₂ stripes serving as transparent electrodes fabricated according to the conventional lift off method, in which the etching is seen to be rough.

Thus, the unevenness of the side surfaces of the stripes is much less by the etching due to sputtering with the Cr film used as a mask than by the conventional lift off method.

The roughness of the side surfaces of the stripes caused through etching due to sputtering with the Al film used as a mask is of the order of several thousand angstroms while that in case where the Cr film is used as mask is of the order of several hundred angstroms. Thus, according to the embodiment, the dimensional precision is seen much improved.

EMBODIMENT 4

The SnO₂ film is etched through sputtering with 10% oxygen gas (O₂) mixed in the argon gas and with a Mn film (1000 A thick) used as a metal mask, instead of the Al and Cr films used as masks in EMBODIMENT 2 and 3. The result is almost the same as the case where the Cr film is used as mask.

As described above, if a photoresist material or a metal such as Al, Cr or Mn is used as mask in contact with the SnO₂ film, the fine working of the SnO₂ film serving as transparent electrode can be performed through etching due to sputtering. Since the SnO₂ film and the metal mask are in close contact with each other, no undesirable side etching takes place during sputtering so that the side surfaces of the stripes become smooth, and smoother especially for the case where the Cr mask is used.

Therefore, according to this invention, there can be provided a photosensitive surface for an image pickup tube, in which a plurality of transparent electrodes are electrically separated from one another, so that this invention proves to be very practically meritorious.

What we claim is:

1. A method of forming a fine pattern of a thin, transparent, conductive film of $SnO_2$, comprising forming a thin, transparent, conductive film of $SnO_2$ on a dielectric substrate; vapor-depositing a thin film of a metal selected from the group consisting of aluminum, chromium and manganese directly on said thin, transparent, conductive film of $SnO_2$; etching said thin metal film into a mask pattern; and sputter etching said thin, transparent, conductive film by the bombardment through said mask pattern with ions of gas accelerated under the influence of an RF electric field.

2. A method as claimed in claim 1, wherein said metal is chromium and the thickness of the chromium film is form 1000 A to 4000 A.

3. A method as claimed in claim 1, wherein said metal is Cr and said gas includes Ar.

4. A method as claimed in claim 1, wherein said metal is Al and said gas includes Ar.

5. A method as claimed in claim 4, wherein said gas includes about 10% oxygen.

6. A method as claimed in claim 1, wherein said metal is Mn and said gas includes Ar.

7. A method as claimed in claim 6, wherein said gas includes about 10% oxygen.

8. A method as claimed in claim 1, wherein said transparent conductive film of $SnO_2$ has a thickness of about 1,000 to 5,000 A.

9. A process for forming a thin layer of a transparent conductive film of $SnO_2$ in the form of a fine pattern on a dielectric substrate comprising forming a continuous thin, transparent, conductive film of $SnO_2$ on said substrate; forming on said film of $SnO_2$ a mask composed of aluminum, chromium or manganese; and removing those portions of said film of $SnO_2$ not covered with said mask by bombarding said portions through said mask with ions of a gas accelerated under the influence of an RF electric field.

10. The process of claim 9, wherein said mask is formed from chromium or manganese.

* * * * *